United States Patent
Larsson

(10) Patent No.: US 7,573,994 B2
(45) Date of Patent: Aug. 11, 2009

(54) METHOD OF ESTABLISHING COOPERATIVE SERVICES IN A COMPUTER SYSTEM

(75) Inventor: Conny Larsson, Stallarholmen (SE)

(73) Assignee: Teligent AB, Nynashamn (SE)

( * ) Notice: Subject to any disclaimer, the term of this patent is extended or adjusted under 35 U.S.C. 154(b) by 178 days.

(21) Appl. No.: 10/589,223

(22) PCT Filed: Feb. 10, 2005

(86) PCT No.: PCT/SE2005/000172

§ 371 (c)(1),
(2), (4) Date: Aug. 11, 2006

(87) PCT Pub. No.: WO2005/079048

PCT Pub. Date: Aug. 25, 2005

(65) Prior Publication Data

US 2007/0185819 A1 Aug. 9, 2007

(30) Foreign Application Priority Data

| Feb. 11, 2004 | (SE) | ..................... 0400292 |
| May 18, 2004 | (SE) | ..................... 0401284 |

(51) Int. Cl.
*H04M 3/42* (2006.01)
(52) U.S. Cl. ............... 379/201.02; 379/201.03; 379/201.04; 379/201.05
(58) Field of Classification Search .............. 379/207.01–207.15; 709/310
See application file for complete search history.

(56) References Cited

U.S. PATENT DOCUMENTS

| 5,938,722 A * | 8/1999 | Johnson ............... 709/105 |
| 6,574,322 B1 | 6/2003 | Larsson ............. 379/207.02 |
| 2003/0009601 A1 * | 1/2003 | Nitta .................. 709/310 |

FOREIGN PATENT DOCUMENTS

| EP | 0 928 548 | 7/1999 |
| WO | WO 96/15616 | 5/1996 |
| WO | WO 98/16071 | 4/1998 |

* cited by examiner

*Primary Examiner*—Curtis Kuntz
*Assistant Examiner*—Phung-Hoang J Nguyen
(74) *Attorney, Agent, or Firm*—Alfred J. Mangels

(57) ABSTRACT

A method of achieving co-acting services in a data system that includes telephone or data services and at least two computer systems. A transaction database connected to each computer contains transactions that are identified by transaction references, where each transaction is part of a data program for executing a service. Fetching of transactions for execution in the data system is initiated in response to an incoming call from a telephone or from an external computer. The call includes an identification of the caller and type of call. All instructions from one computer system to another takes place through the agency of the transactions, wherein certain transaction references identify transactions that upon execution transfer the service to a computer system other than the call-receiving computer system for execution. Caller information is transferred together with the transfer of the service.

7 Claims, 1 Drawing Sheet

METHOD OF ESTABLISHING COOPERATIVE SERVICES IN A COMPUTER SYSTEM

BACKGROUND OF THE INVENTION

1. Field of the Invention

The present invention relates to a method of achieving co-acting services in a data system.

2. Description of the Related Art

There is described in European Patent Specification No. 0 928 548 a prior art system for executing a telephone service, wherein the service is executed by calling a number of transactions from a database containing the transactions, after which the services are executed. That system is tied to a local system, in other words execution takes place on the computer called directly or indirectly by a client.

With regard to the management of greater and more complex services, it is probable that more than one called computer will be required to participate in the processing of information and the execution of the services.

That problem is resolved by means of the present invention, which enables several computers to co-act with one another.

SUMMARY OF THE INVENTION

The present invention thus relates to a method of achieving mutually contacting services in a data system that includes telephone services and/or data services. The data system includes a first computer system and at least one further, a second, computer system, wherein each computer system includes a computer with associated memories. The first and the second computer systems are respectively connected to at least one communications database that includes communications services, particularly telephone and data services, stored as transaction references, i.e., as references to transactions. The computer system is adapted to execute the communications services in accordance with a data program, wherein at least one transactions database connected to each computer contains a predetermined number of transactions that are identified by the transaction references. Each transaction is in the form of parts of a data program and respective computer systems fetch one or more transactions from the transaction database or databases, the transactions together forming a data program for executing the services. The transactions include instructions concerning the services and also other concerned services that are to be executed by the data system. Initiation to fetch transactions for execution in the data system takes place by means of a call incoming to the system from a telephone, or from an external computer to which a communications service is tied in the communications database. The call includes an information part in the form of an identification of the caller (ID) and an indication of the type of call. The first computer system and the second computer system have an execution environment such that generally all execution processes and all instructions from a computer system to other computer systems in the data system are effected through the agency of the transactions. Given transaction references identify transactions which upon execution cause the service concerned to be transferred to a computer system other than the call-receiving computer system for execution of the earlier-mentioned computer system, and the information part is transferred in the transfer process.

BRIEF DESCRIPTION OF THE DRAWING

The present invention will now be described in more detail with reference to an exemplifying embodiment illustrated in the accompanying drawing, in which.

DESCRIPTION OF THE PREFERRED EMBODIMENTS

Figure 1:
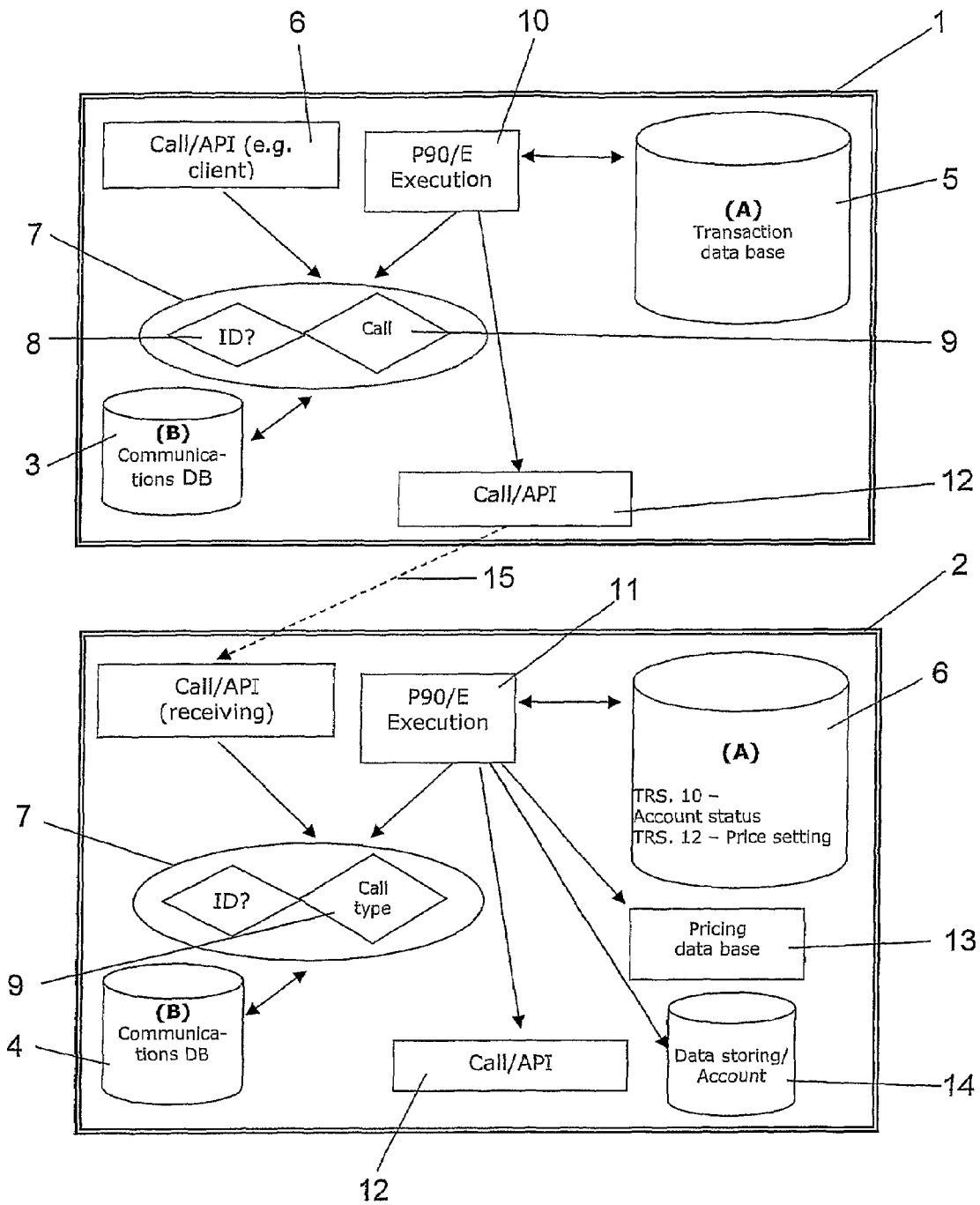
FIG. 1 is a block diagram of two mutually co-acting computers in a data system.

FIG. 1 illustrates two mutually co-acting computer systems, each including a computer system 1, 2 with associated databases.

Each computer system 1, 2 is connected to at least one communications database 3, 4 that includes communications services, particularly telephone and data services, that are stored as transaction references (TRS), i.e., as references to transactions. The computer systems are adapted to execute the communications services in accordance with a data program. Each computer system 1, 2 has connected thereto at least one transaction database 5, 6, which databases contain a predetermined quantity of transactions that are identified by the transaction references.

Each transaction is defined by means of the transaction references, for instance by the two transaction references referenced TRS.10 and TRS.12. The transactions per se are in the form of parts of a data program, wherein the computer systems fetch one or more transactions from the transaction database or databases, the transactions forming together a data program for executing the service.

According to the invention the transactions include instructions relating to the services and also to additional services that are to be executed by the data system that includes two or more computers.

Fetching of transactions for execution in the system is initiated by means of a call 6 incoming to the system from a telephone, or from an external computer to which a communications service is tied in the communications database 3 in the event of the call incoming to the computer system 1.

The call 6 includes an information part 7 in the form of an identification 8 (ID) of the caller and an indication 9 of the type of call. The type of call can be a voice call, a data communication, a transaction, etc.

According to the invention, a first part 1 of the computer system and also a second part 2, and also further parts of the data system, are given an execution environment whereby essentially all execution and all instructions from a computer system 1 to other computer systems 2 in the data system take place through the agency of the transactions. In that regard, the information part 7 is transferred from a transmitting computer system 1 to a receiving computer system 2.

Each computer system includes a known type of computer 10, 11 with associated memories.

The execution environment is preferably the environment described in the above-identified European patent specification.

In response to the call 6, the data system functions to execute the steps of at least determining the identity 8 of the caller and the type of call 9 concerned. In that regard, the communications database 3, 4 causes the computer to fetch the transaction references that are tied to the caller and the type of call concerned. The type of call can be a voice call, data communication, transactions, etc. The transaction references fetched define the services that are called for and that are to be executed. The computer fetches on the basis of the fetched transaction references those transactions in the transaction database 5 that correspond to the transaction references, after which the services are executed through the agency of the transactions.

According to the present invention, certain transaction references identify transactions which, upon execution, cause the service in question to be transferred to a computer system 2 other than the call-receiving computer system 1, for execution in computer system 2, and wherein the information part 7 is transferred in the transfer of the service to the other computer system 2.

Thus, when a call arrives at the computer system 1, the system fetches transaction references from the communications database 3, whereupon transactions corresponding to the transaction references are fetched from the transaction database 5 and are executed in the first computer system 1. One or more of those transactions can cause the execution of the service to be transferred, upon execution, to another computer system 2 via an API 12 (Application Program Interface). Thus, the service to be executed lands in the second computer system 2. Because the information part 7 accompanies the transfer, the second computer system will detect that information part. That enables the execution to be distributed to a manifold of computer systems.

According to a very important feature of the transfer process, transaction references for the execution of a given service are transferred from a computer 10 to another computer 11 within the data system. The computer system to which the transfer is made thus obtains transaction references and fetches transaction-reference-corresponding transactions from the transaction database. That results in the transfer of only a small amount of data in comparison with the amount that would be transferred if all transactions were transferred.

In the event that a computer system does not have a transaction corresponding to a transferred transaction reference, the computer system that received the transaction references returns the task to the computer system from which the task arrived.

However, in addition to transferring transaction references in the newly-mentioned case, a computer system can also transfer one or more transaction references with associated transactions to another computer system, provided that the transferring computer system is aware that the transactions are missing in the other computer system.

In order for the invention to obtain full effectiveness, it is essential that all of the above-mentioned computer systems have mutually the same execution environment.

According to one preferred embodiment of the invention, respective communications databases also contain references to transactions concerning the further services that can later be executed in response to a requested communications service. Such a further service can be the transfer of execution to another computer system.

It is thus essential that the first computer system fetch transactions from the transaction database corresponding to a service initiated by the call in response to a direct call, or an indirect call via the further computer, from a telephone, or from an external computer, wherein the first computer system distributes transaction references to one or more of the further computer systems, and wherein each of the last-mentioned computer systems fetches transactions from respective computer-system transaction databases, in order to execute the service defined by the transaction references.

An illustrative example in this case can be the price or tariff set for a telephone or data service. In that respect, a number of the first computer systems 1 may be located at different places in the country for administering telephone services or data services on behalf of clients in different parts of the country.

When a call 6 arrives at the first computer system, the service is connected between the calling subscriber and the desired contact. That connection is effected by executing transactions in the first computer system. One or more transactions concerns price setting and a transfer of the price setting procedure to the second computer system. The second computer system receives transaction references from the first computer system, which causes the second computer system 2 to fetch transaction references relating to price setting from its communications database 4. Those transactions have been exemplified in FIG. 1 by the references TRS.10 and TRS.12.

Those transactions are executed in the second computer system 2, wherein the transactions cause, among other things, a price-setting database 13 to be called and the price stored in a memory 14 and then later billed to the client whose information part 7 was transferred from the first computer system to the second computer system in respect of the call 15 between the computer systems.

The present invention is in no way limited to the execution of the described service.

Although the invention has been described with reference to a number of embodiments thereof, it will be understood that the computer systems can include more than two systems, and that the systems can be adapted to those services, or the like, to be executed.

The present invention should therefore not be considered to be restricted to the above-described exemplifying embodiments thereof, since variations and modifications can be made within the scope of the accompanying claims.

What is claimed is:

1. A method of achieving cooperative services in a data system for providing communications services that include telephone services and data services, wherein the data system includes a first computer system and a second computer system, wherein the computer systems each includes respective computers having associated memories, said method comprising the steps of:

connecting the first and the second computer systems to their own respective communications databases that include respective stored communications services transactions identified as transaction references, wherein said computer systems each executes communications services in accordance with a data program applicable to a requested communications service and composed of one or more transactions;

connecting each computer to a respective transaction database, wherein each of the transaction databases includes a pre-determined number of transactions that are identified as respective transaction references, wherein each transaction is a part of a particular data program for executing said communications services, wherein the transactions include instructions relating to said services to be executed by the data system in response to a requested communications service;

initiating fetching of transactions for execution in the data system in response to a telephone call incoming to the first computer system, wherein the call includes an information part in the form of an identification of a caller and an indication of the type of call;

transmitting the information part from the first computer system to the second computer system, wherein the computer systems each has an execution environment such that essentially all execution and instructions transmitted from the first computer system to the second computer system takes place through said transactions;

assembling the fetched transactions for executing the requested communications services, wherein the transactions execute the requested communications services to be executed by the data system, and wherein the execution of the transactions occurs in one or more of the first and second computer systems based upon a transaction reference associated with the identity of the caller and the type of call received by the first computer system; and transferring a requested communications service to be executed and the information part to a computer system other than the call receiving computer system when transaction references identify predetermined transactions.

2. A method according to claim 1, including the steps of: identifying the caller, the type of call, and the service called for; and fetching transaction references from said communications database for executing the called for service.

3. A method according to claim 1, including the step of transferring transaction references for the execution of a given service from one computer to another computer within the data system.

4. A method according to claim 1, including the step of providing for all computer systems to have mutually the same execution environment.

5. A method according to claim 1, including the step of providing a communications database containing references to transactions stored in the transaction databases.

6. A method according to claim 5, wherein the communications database includes references to transactions relating to additional services for subsequent execution in response to a requested communications service.

7. A method according to claim 1, including the steps of: fetching from a transactions database transactions corresponding to a service initiated by a call from one of a telephone and an external computer via said second computer system; distributing from the first computer system transaction references to the second computer system, wherein the second computer system fetches from the transactions database of a respective computer system transactions for executing a service defined by the transaction references.

* * * * *